UNITED STATES PATENT OFFICE.

HENRY SPENCER BLACKMORE, OF MOUNT VERNON, NEW YORK.

COMPOUND OR COMPOSITION FOR REMOVING PAINT, VARNISH, OR OTHER SUBSTANCES.

1,184,164.   Specification of Letters Patent.   Patented May 23, 1916.

No Drawing.   Application filed October 21, 1911.   Serial No. 655,952.

*To all whom it may concern:*

Be it known that I, HENRY SPENCER BLACKMORE, a citizen of the United States, residing at Mount Vernon, in the county of Westchester and State of New York, have invented certain new and useful Improvements in Compounds or Compositions for Removing Paint, Varnish, or other Substances, of which the following is a specification.

This invention relates to paint, varnish or other finish removers and solvents for oils, fats, resins, and other water repellent or water insoluble substances and comprises comparatively non-volatile, fixed, or viscous solvents such as the acetic esters of terpenes, either *per se* or associated with a diluent, of solvent or inert nature with reference to paint, varnish, etc., miscible therewith.

The object of the invention being to provide a compound or composition capable of softening, dissolving or releasing paints, varnishes or other substances from within or associated with a carrier or supporter or communicating with the same in an attached manner, and process of making such compound or composition.

As an example of a compound or composition, in accordance with the present invention and process of making the same, a mixture of methyl and ethyl alcohol in proportion of about 10% of the former and 90% of the latter, or what is commonly termed methylated spirit or methylated denatured alcohol, is taken and mixed with camphor oil in proportion of about four of the former to one of the latter. To this mixture is then added concentrated acetic acid of an acid content sufficient when subjected to dehydrating agents, such as sulfuric acid, to form an acetic ester therewith, in this case comprising methyl, ethyl, pinene acetate, the proportion by weight being approximately as follows:—methyl alcohol (95%) 10 pounds, ethyl alcohol (95%) 90 pounds, camphor oil (heavy) 25 pounds, acetic acid (28%) 260 pounds. This mixture of methyl-ethyl alcohol, camphor oil and acetic acid is thoroughly mixed and allowed to flow gradually into a still containing strong sulfuric acid (66° Baumé) in such a manner that it is introduced below, or near the bottom, of the acid so that ascending through the same it becomes intimately mixed therewith, resulting in the dehydration and esterification of the composition. The materials in the still under ordinary atmospheric pressure are maintained at a temperature at which the esters form, volatilize or distil, preferably approximately 160° C. or at variable selective points according to the condition of pressure under which the ingredients may exist *i. e.* under reduced pressure the products volatilize and distil at lower temperatures. It is preferable, although not obligatory to carry on this distillation and esterification in a partial vacuum, whereby the union, combination and separation by distillation of the product is facilitated.

The result of this process, employing the ingredients described, provides at once a pinene acetate associated with a diluent comprising methyl acetate and ethyl acetate, both of which augment the solvent action of the pinene acetate and render it suitably fluent for ready application.

When a terpene acetate, such as pinene acetate, is desired *per se*, camphor oil is associated with glacial acetic acid in proper combined proportions as to acetyl contents and this is gradually supplied to and through a suitable dehydrating agent in the still as in the foregoing illustration, which dehydrating agent may be sulfuric acid, zinc chlorid or other substance having superior affinity for water to such an extent as to dehydrate the mixture to a degree that the anhydrous acetic acid will form with the terpene present a condensation, addative or other combination whereby an acetylated terpene, such as pinene acetate results. And in this case it is preferable to carry on the process under reduced pressure or in partial vacuum while the materials are heated to a point at which the product is vaporized and distilled under the existing conditions of pressure.

Under the classification of terpenes, in accordance with that term as employed in this specification and claims, it is intended to imply and include, and does imply and include, all characters of terpenes be they hemiterpenes, such as isoprene ($C_5H_8$), terpenes proper such as pinene ($C_{10}H_{16}$), polyterpenes of any polymeric character having the general formula ratio of $(C_{10}H_{16})_n$ or sesquiterpenes which may include compounds or compositions of polymeric form, of terpenes and hemiterpenes, either *per se*, in any form or character, or associated with other vehicles or substances, such as a condition in which they may be found in nature, such as camphor oil, turpentine or other substances.

The terpenes employed may be derived from substances containing them such as camphor oil, or existing as such *per se*, or from substances capable of forming, yielding or producing the same so long as the terpene is subjected to the action of acetic acid and a dehydrating agent or otherwise associated with an esterizing compound or composition under conditions whereby the product desired may be produced and secured.

The esterization of the terpene may be accomplished by associating the terpene or terpene containing, yielding or forming substance with hydrated acetic acid in the presence of a dehydrating agent or in the presence of a suitable acetate or other substance capable of forming, yielding or liberating the same, such as calcium acetate and sulfuric acid, or sodium bisulfate, or by any other means whereby a union, condensation or formation of an addative or other esterizated product of terpene may be formed, liberated or secured.

Instead of producing the esterizated terpene simultaneously with an alkyl acetate, such as methyl acetate and ethyl acetate, as results in the performance of the first example herein set forth, methyl acetate and ethyl acetate may be individually or collectively formed and employed by mixing it with such substances or diluent, which also augment the solvent action of the terpene acetate with the same after its formation, I can also employ other diluents of augmenting solvent or solvent inert character, such for example as the aldehydes and particularly the polymeric aldehydes such as paraldehyde.

The terpenes employed or esterized may also be of oxygenated, hydroxylated, or of other form or nature so long as they unite to form an esterated compound in the presence of acetic acid and dehydrating agent, or in the presence of the same associated with oxygen containing, yielding, forming, or delivering substances.

The term or expression "comparatively non-volatile solvent ester" employed herein and the claims hereafter is intended to imply, and does imply an ester or ethereal salt of substantially non-volatile or fixed character under ordinary atmospheric conditions of temperature and pressure and specifically of solvent nature with reference to paint, varnish or other material to be softened or removed, so that the same when applied remains in juxtaposition to or in communication with the substance to which applied until the same shall have dissolved or softened the material without substantial loss by volatilization or evaporation, and the term "diluent" to a miscible vehicle for the fixed or comparatively non-volatile ester which may be inert or augmenting as to the solvent action of the fixed ester toward paints, varnishes, etc.

Instead of acetic acid, or acetic esters of terpene I can employ any fixed or comparatively non-volatile ester of solvent character, of which terpene forms a part or a constituent, such as terpene formate, terpene propionate, terpene lactate or other terpene ester, any or all of which may be employed individually or collectively as esters *per se* or associated with suitable diluents as aforesaid.

The compound or composition thus formed is substantially neutral in its character as to acid and alkaline properties, of non-corrosive nature, and does not wet or swell the grain of wood or remove the filler when the wood surface is reached upon the removal of the coating of paint, varnish or other substance, nor does it stain the same. The esters thus formed are water-repellent or substantially insoluble or sparingly soluble in water and by action of steam or metal alkalis are hydrolyzed or saponified and reverted into alcohols, terpenes, and corresponding acid or alkali metal salt thereof.

Where the term "acetate" is employed herein, it is intended to imply and does imply an acetate of hydrogen or other metal, which by action of the dehydrating agent, such as sulfuric acid, in the presence of a terpene, a terpene yielding or a terpene containing substance will produce a terpene acetate, hydrogen being considered as a metal from a chemical standpoint and being analogous to other metals in the formation of chemical compounds, the acids being considered as salts of hydrogen, such as hydrogen acetate (acetic acid).

Having now described my invention, what I claim as new, and desire to secure by Letters Patent is:—

1. A compound or composition for removing paint, varnish or other substances, comprising a comparatively non-volatile solvent ester and an acetic ester.

2. A compound or composition for removing paint, varnish or other substance, comprising a comparatively non-volatile solvent ester and alkyl acetate.

3. A compound or composition for removing paint, varnish or other substance, comprising a comparatively non-volatile solvent ester and methyl acetate.

4. A compound or composition for removing paint, varnish or other substance, comprising a comparatively non-volatile solvent ester, and methyl and ethyl acetate.

5. A compound or composition for removing paint, varnish or other substance, which comprises a comparatively non-volatile ethereal acetate and a volatile ethereal acetate.

6. A compound or composition for removing paint, varnish or other substance, comprising a fluid terpene ester.

7. A compound or composition for removing paint, varnish or other substance, comprising a terpene acetic ester.

8. A compound or composition for removing paint, varnish or other substance, comprising a terpene acetic ester and a fluid diluent.

9. A compound or composition for removing paint, varnish or other substance, comprising a terpene ester and a fluid diluent.

10. A compound or composition for removing paint, varnish or other substance, comprising a terpene ester and a solvent diluent.

11. A compound or composition for removing paint, varnish or other substance, comprising a terpene acetic ester and a solvent diluent.

12. A compound or composition for removing paint, varnish or other substance, comprising a terpene acetic ester and an alkyl acetate.

13. A compound or composition for removing paint, varnish or other substance, comprising a terpene acetic ester, an alkyl acetate and a fluid diluent.

14. A compound or composition for removing paint, varnish or other substance, comprising a terpene acetic ester, an alkyl acetate, and a solvent diluent.

15. A compound or composition for removing paint, varnish or other substance, comprising a terpene acetic ester, and methyl acetate.

16. A compound or composition for removing paint, varnish or other substance, comprising a terpene acetic ester, methyl acetate and a fluid diluent.

17. A compound or composition for removing paint, varnish or other substance, comprising a terpene acetic ester, a methyl acetate and a solvent diluent.

18. A compound or composition for removing paint, varnish or other substance, comprising a terpene acetic ester, methyl acetate and ethyl acetate.

19. A compound or composition for removing paint, varnish or other substance, comprising a terpene acetic ester, methyl acetate, ethyl acetate and a fluid diluent.

20. A compound or composition for removing paint, varnish or other substance, comprising a terpene acetic ester, methyl acetate, ethyl acetate and a solvent diluent.

21. A process of making the compound or composition herein set forth, which comprises exposing a terpene-containing substance and methyl alcohol to the action of an acetate and a dehydrating agent.

22. A process of making the compound or composition herein set forth, which comprises exposing a terpene containing substance, methyl alcohol and ethyl alcohol to the action of an acetate and a dehydrating agent.

23. A process of making the compounds or composition herein set forth, which comprises exposing a terpene-containing substance and methyl alcohol to the action of acetic acid and dehydrating agent.

24. A process of making the compound or composition herein set forth, which comprises exposing a terpene-containing substance and methyl alcohol and ethyl alcohol to the action of acetic acid and a dehydrating agent.

25. A compound or composition for removing paint, varnish, or other substance, which comprises a fluid hemi-terpene ester.

26. A compound or composition for removing paint, varnish, or other substance, which comprises a hemi-terpene acetic ester.

27. A compound or composition for removing paint, varnish, or other substance, which comprises a hemi-terpene ester and a fluid diluent.

28. A compound or composition for removing paint, varnish, or other substance, which comprises a hemi-terpene acetic ester and a fluid diluent.

29. A compound or composition for removing paint, varnish, or other substance, which comprises a hemi-terpene ester and a solvent diluent.

30. A compound or composition for removing paint, varnish, or other substance, which comprises a hemi-terpene acetic ester and a solvent diluent.

31. A compound or composition for removing paint, varnish, or other substance, which comprises a hemi-terpene ester and an acetic ester diluent.

32. A compound or composition for removing paint, varnish, or other substance, which comprises a hemi-terpene acetic ester and a methyl acetic ester diluent.

33. A compound or composition for removing paint, varnish, or other substance, which comprises a fluid pinene-hydrogen ester.

34. A compound or composition for removing paint, varnish, or other substance, which comprises pinene-hydrogen acetate.

35. A compound or composition for removing paint, varnish, or other substance, which comprises a pinene-hydrogen ester and a fluid diluent.

36. A compound or composition for removing paint, varnish, or other substance, which comprises pinene-hydrogen acetate and a fluid diluent.

37. A compound or composition for removing paint, varnish, or other substance, which comprises a pinene-hydrogen ester and a solvent diluent.

38. A compound or composition for removing paint, varnish, or other substance, which comprises pinene-hydrogen acetate and a solvent diluent.

39. A compound or composition for removing paint, varnish, or other substance, which comprises a pinene-hydrogen ester and an acetic ester diluent.

40. A compound or composition for removing paint, varnish, or other substance, which comprises pinene-hydrogen acetate and a methyl acetic ester diluent.

41. A compound or composition for removing paint, varnish, or other substance, which comprises a fluid olefin-hydrogen ester.

42. A compound or composition for removing paint, varnish, or other substance, which comprises an olefin-hydrogen ester and a fluid diluent.

43. A compound or composition for removing paint, varnish, or other substance, which comprises an olefin-hydrogen ester and a solvent diluent.

In testimony whereof I affix my signature in presence of two witnesses.

HENRY SPENCER BLACKMORE.

Witnesses:
LOUISE C. SIECKE,
WM. PFEIFFER.